United States Patent

[11] 3,578,365

| [72] | Inventors | Rudolf Gottschald; deceased late of Erika, sole heir Gottschald, Osterath, Germany |
|---|---|---|
| [21] | Appl. No. | 759,827 |
| [22] | Filed | Sept. 11, 1968 |
| [45] | Patented | May 11, 1971 |
| [73] | Assignee | A. Ehrenreich & Cie Dusseldorf-Oberkassel, Germany |
| [32] | Priority | Sept. 14, 1967 |
| [33] | | Germany |
| [31] | | P 16 25 532.6 |

[54] BALL AND SOCKET JOINT
3 Claims, 3 Drawing Figs.

[52] U.S. Cl. .................................................. 287/87
[51] Int. Cl. .................................................. F16c 11/06
[50] Field of Search .......................................... 287/90 (C), 90 (A), 87, 90 (B)

[56] References Cited
UNITED STATES PATENTS

| 2,490,972 | 12/1949 | Lear | 287/85AX |
| 2,957,714 | 10/1960 | Langen | 287/90C |
| 3,114,569 | 12/1963 | Carlson | 287/87 |
| 3,130,992 | 4/1964 | Peras | 287/87 |

FOREIGN PATENTS

| 552,405 | 4/1943 | Great Britain | 287/85A |
| 1,012,642 | 4/1952 | France | 287/90C |

Primary Examiner—David J. Williamowsky
Assistant Examiner—Andrew V. Kundrat
Attorney—Walter Becker ABSTRACT: A ball and socket joint, particularly for the steering and tie rods of motor vehicles, comprising a housing having a cover with a tear-off strip for facilitating removal of said cover.

BALL AND SOCKET JOINT

The present invention relates to a ball and socket joint, particularly for the steering and tie rods of motor vehicles.

Ball and socket joints of this kind are known. They have a ball stud mounted in a housing with the aid of two ball cups, one of which is resiliently pressed against the ball stud, e.g. by means of a compression spring bearing against the lid of the housing.

Essentially two different forms of embodiment are known for this lid. In one, the lid has the form of a screwcap which is screwed into the housing. This makes possible a dismantling of the ball and socket joint, e.g. for repairs. The drawback of this embodiment is a high production expenditure necessitated by the precise mounting and sealing of the joint.

To avoid these drawbacks, the second form of embodiment involves closure of the housing of the ball and socket joint by means of a lid which is nondetachably fastened to the housing. This is achieved by the rolling-in of an annular housing portion which externally surrounds the lid closing the orifice of the housing. The advantage of this second form of embodiment is in the lower manufacturing costs. However, since in view of the rolled joint the ball and socket joint cannot be dismantled in case of damage, the entire ball and socket joint must be discarded if damage occurs. Moreover, where ball and socket joints according to the second form of embodiment are nondetachably fastened to the steering and tie rods, the corresponding rod with the second ball and socket joint must also be discarded.

It is an object of the invention to provide a ball and socket joint, especially for the steering and tie rods of motor vehicles, which will overcome the above-mentioned drawbacks.

It is another object of the present invention to provide a ball and socket joint as outlined above, which would be simple to construct and inexpensive to manufacture and which could be dismantled and repaired in case of damage to one of its parts.

These and other objects and advantages of the invention will appear more clearly from the following specification in connection with the accompanying drawing, in which.

Figure 1:
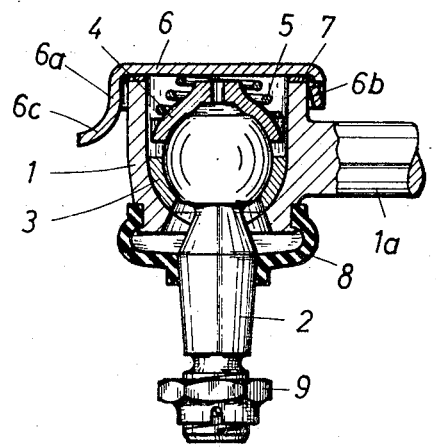
FIG. 1 is a longitudinal section through the ball and socket joint according to the present invention.

The invention proposes to construct a smooth-walled housing and to provide the lid with a flange having inward bent sharp-edged retaining lugs.

According to a further feature of the invention, a tear-off strap is arranged on the lid to facilitate its removal. To achieve a satisfactory sealing, a packing is inserted between the front surface of the housing and the lid.

If damage occurs to a ball and socket joint constructed according to the invention, it suffices to destroy the lid to make possible the dismantling and repair of the joint, whereafter a new lid can be mounted with simple means on the housing. This provides a simple and inexpensive means for repairing the ball and socket joint. Moreover, the provision of the tear-off strap makes it possible to remove the lid without having to use special tools.

Referring now to the drawing in detail, the ball and socket joint has a housing 1 into which a ball stud 2 is mounted movably by means of a lower ball cup 3 and an upper ball cup 4. The housing 1 is provided with a connecting pin 1a, by means of which it is fastened to a tie rod (not shown). The ball stud 2 is in turn attached with a conical part to a likewise not illustrated component to be moved, to which end it is provided with a crown nut 9.

The ball pivot 2 and the ball cups 3 and 4 are introduced into the housing from above, whereupon the upper orifice of the housing 1 is closed by means of a lid 6. This lid 6 supports a compression spring 5, which presses the upper ball cup 4 against the ball stud 2.

The passage for the ball stud 2 is sealed by means of a sealing bellows 8. Furthermore, packing 7 is inserted between the lid 6 and the housing 1.

Figure 3:
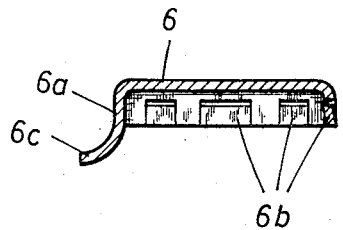
FIG. 3 is a section taken along the line III—III of FIG. 2.

The housing 1 is smooth-walled on its surface adjacent to the large orifice, as shown in FIG. 1. The lid 6 has a flange 6a from which sharp-edged retaining lugs 6b extend inwardly. These retaining lugs 6b, shown in detail in FIG. 3, clamp fast on the edge of the housing 1 and provide for the lid 6 a fastening which is sufficient for a single use of the latter even over an extended period of time to insure a secure closing of the housing 1.

Figure 2:
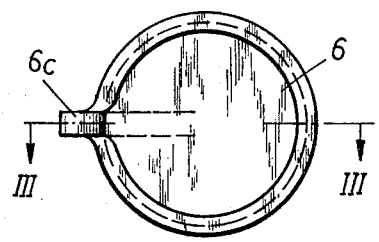
FIG. 2 is a top view of a lid forming a part of the present invention.

In order to facilitate the removal of the lid 6, the latter is provided with a tear-off strap 6c by means of which the lid 6 can be ripped over substantially half its diameter, as indicated by the perforations in FIG. 2.

When parts of the ball and socket joint according to the invention become defective, the lid 6 is destroyed by means of the tear-off strap 6c and removed from the housing 1. This frees the orifice of the housing 1, so that the ball and socket joint can be repaired. After assembly and insertion of a new packing 7 a new lid 6 is fitted, which operation does not require any special tools. Consequently, the arrangement proposed according to the invention combines the advantages of a simple and inexpensive ball and socket joint construction with the possibility of dismantling and repairing said joint.

It is to be understood, of course, that the specification and drawings in no way limit the present invention, the scope of which is determined by the disclosure.

It is claimed:

1. A ball and socket joint, particularly for steering and tie rods of motor vehicles, which comprises: a smooth-walled housing having a shank fixedly connected thereto, said housing also having a first opening therein for permitting the insertion of a ball head together with a ball stud therethrough, said housing also having a second opening for the passage of the ball stud only therethrough, ball cup means located within said housing and enclosing said ball head, a removable cover for said first opening of said housing, said cover being provided with a flange extending therefrom in an axial direction and with said flange having inwardly bent sharp-edged retaining lugs extending from its inner periphery and inclined toward the cover for externally engaging said housing and connecting said housing with said cover, and spring means located between said cover and said ball cup means and exerting pressure on at least part of said ball cup means for resiliently pressing the same against said ball head.

2. A ball and socket joint, particularly for steering and tie rods of motor vehicles, which comprises: a housing having a shank fixedly connected thereto, said housing also having a first opening therein for permitting the insertion of the ball head together with a ball stud therethrough, said housing also having a second opening for the passage of the ball stud only therethrough, ball cup means located within said housing and enclosing said ball head, a removable cover for said first opening of said housing, said cover being provided with a flange having inwardly bent retaining lugs for engaging said housing and connecting said housing with said cover, a part of said cover being formed by a tear-off strip adapted to be torn off to permit removal of said cover, and spring means located between said cover and said ball cup means and exerting pressure on at least part of said ball cup means for resiliently pressing the same against said ball head.

3. A ball and socket joint according to claim 2, which includes a packing fitted between said cover and said housing.